May 22, 1945.  H. D. WALL ET AL  2,376,640
COMBINED OVEN TRAY AND COOKING RACK
Filed Sept. 11, 1944

Inventor
Harry D. Wall
Preston B. Wall
Atty

Patented May 22, 1945

2,376,640

UNITED STATES PATENT OFFICE 2,376,640

COMBINED OVEN TRAY AND COOKING RACK

Harry D. Wall, Pasadena, and Preston B. Wall, Oakland, Calif.; said Harry D. Wall assignor to Rack's Inc., Pasadena, Calif., a corporation of California Application September 11, 1944, Serial No. 553,580

6 Claims. (Cl. 99—426)

This invention relates generally to cooking supports; and the general purpose of the invention is to provide a combined oven tray and cooking rack which is capable, with the easy and quick adjustment, of use as an ordinary flat oven tray or of use as an adjustable cooking rack for roasting and similar operations.

Several different types of cooking racks have been previously proposed. Among others we may call attention to the cooking rack of Harry D. Wall, which is the subject-matter of application for United States Patent Ser. 528,210, filed March 27, 1944, now issued as Patent No. 2,360,026, dated October 10, 1944. Such a cooking rack is commonly used in a drip pan, or it may be stood upon an oven tray for such cooking operations as roasting, etc. To use the oven tray as such, it is however necessary to remove the cooking rack; and likewise to assemble and adjust the cooking rack and place it upon the oven tray if the services of the rack are desired.

In our new and improved combination, the oven tray structure and an adjustable rack structure are so cooperatively combined that the cooking rack remains at all times permanently affixed to the tray structure; and simple and quick adjustments put the parts into such position that the combined structure may be used in the manner of a simple oven tray—for all the uses to which such a tray is put—or may be used in adjusted positions as a supporting rack for roasting, etc.

Figure 1:
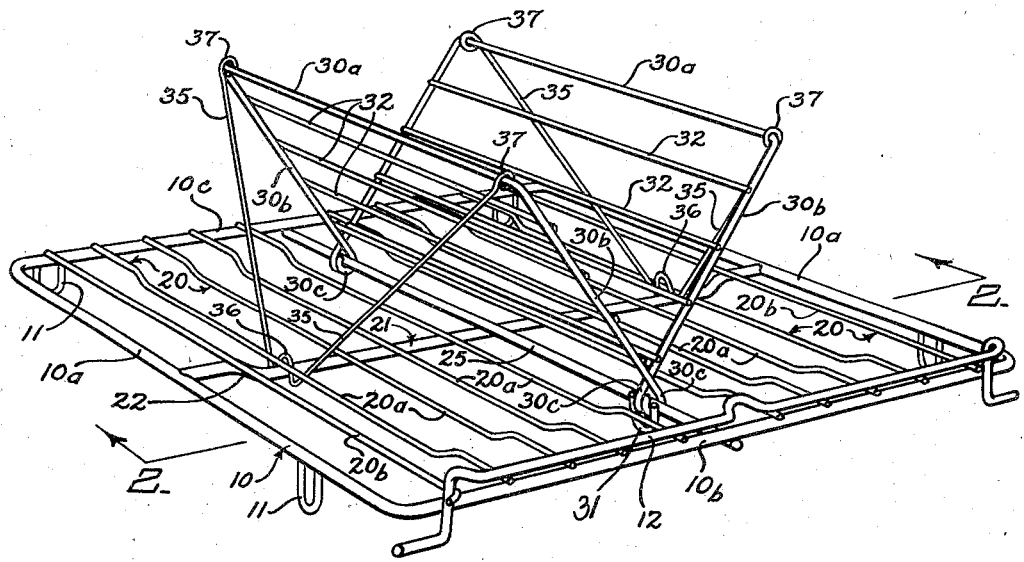
Figure 2:
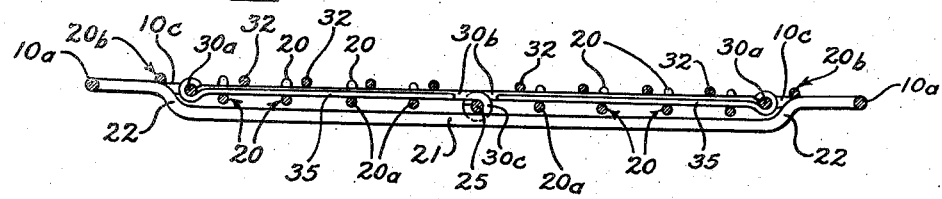

An illustrative structure which embodies our invention is shown in the accompanying drawing in which Fig. 1 is a perspective showing the combination adjusted into position for use as a rack, and Fig. 2 is a section taken as indicated by line 2—2 on Fig. 1 and showing the cooking rack adjusted to its position where the combination is used as a tray.

In the drawing we show a tray structure which, in general outline and configuration is similar to a standard oven tray. As shown, the tray structure comprises an outer rectangular framing 10, of rod or heavy wire, having longitudinal members 10a and front and rear transverse members 10b and 10c, like a standard oven tray. Oven trays are usually made to standard sizes and are made to slide in ways on the oven side walls. They may be provided with supporting feet such as shown at 11, and also with an elevated cross rod such as shown at 12 which serves among other things as a handle for convenience in sliding the tray in and out. These latter mentioned details are however immaterial to our invention.

The frame 10 is spanned by a suitable number of spaced grill wires or rods which are generally designated by the numeral 20. As here shown, these grill forming rods extend longitudinally of the tray frame and are welded to front and rear members 20b and 20c. Instead of being straight from end to end, as is normally the case in oven trays, some if not all of the rods 20 have their medial portions 20a depressed to a level below the end portions of the rods. The vertical dimension of this depression will appear from what follows. A central transverse supporting member 20, preferably of heavier rod like frame 10, extends transversely between frame sides 10a and extends under the depressed grill rods 20a, and is preferably welded to them. At its ends, where it is welded or secured to the frame, this transverse supporting rod 21 is substantially in the horizontal plane of the frame; and it is bent as at 22 so that its medial portions lie directly under and in supporting contact with the depressed grill rod portions 20a. In some structures all of the grill rods 20 may be depressed in their medial portions; or, as is shown in the drawing, the outermost rods 20, specifically designated as 20b, may be straight from end to end and have no depressed portion; and the transverse supporting rod 21 is shaped to give central support to those two outermost rods also.

A central longitudinal straight pivot rod 25 extends longitudinally between front frame rod 10b and rear frame rod 10c and is welded or otherwise secured to the under sides of those last named rods. That positioning of the central pivot rod 25 places it at a level which is below the level of the front and rear ends of grill rods 20, which are secured to the upper faces of the frame. The depressed portions 20a of the grill rods also lie in about the horizontal plane of pivot rod 25, as shown in Fig. 2.

Rod 25 forms the pivot for a pair of rack members, each of which is made up of a U-shaped rod or wire frame and spaced grill rods. Each rack member frame is preferably made of a single piece of fairly heavy wire or light rod and comprises an outer-upper member 30a and two end members 30b formed with eyes 30c at their inner-lower ends encompassing pivot rod 25. To hold the rack frames against displacement longitudinally of pivot rod 25, a small stirrup 31 encompasses two adjacent eyes 30c and is welded to rod 25. Fig. 1 shows the arrangement.

The spaced grill rods or wires 32 of the two racks are welded or otherwise secured to upper faces of rack frame members 30b. The eyes 30c are formed in such relation to frame member 20b, as shown in Fig. 2, that when the rack frames are lowered to the position of Fig. 2 the frame members 30b, supported by pivot rod 25 at their inner ends, lie flatly on the depressed central portions 20a of the tray grill rods 20; and in that position of the parts, the rack grill rods 32, secured to the upper faces of frame members 30b, lie approximately, if not exactly, in the horizontal plane of the un-depressed end portions of tray grill rods 20. Fig. 2, which shows grill rods 32 in cross section, and shows the far ends of rods 20 in elevation, shows the relationships.

As shown in Fig. 2, in a combined device of the particular proportionate dimensions here illustrated, outer framing rod 30a of each rack does not lie quite as far outwardly from central pivot rod 25 as the outermost tray rod 20b; and for that reason in this particular design, that outermost tray rod 20b is here shown as being straight and not depressed in its central portions. However those outermost rods 20b can be depressed like the others, and the dimensions of the racks increased, if desired, so that the outer rack rods 30a would then lie outwardly beyond the outermost tray rod 20 when the parts are in the position shown in Fig. 2.

To support the two racks in various adjusted angular positions, we provide supporting braces each of which is made up of a single length of wire or rod in general V-formation, as illustrated in Fig. 1. Each of the sides 35 of this V has an eye 37 at its outer or upper end encompassing a rack member 30a; and at the junction of the two sides of the V-formation a bent notch portion 36 is formed which fits over the central transverse supporting rod 21 to support the racks in adjusted raised angular position. By placing the supports in various positions on rod 21, against any selected grill wire 20a, the racks may be supported in various angular positions, as will be evident.

The wire of which the supporting V-formations is formed is preferably somewhat smaller than the wire or rod which forms the frames 30a, 30b, of the racks; and the effective length dimensions of these supporting V-formations (the dimension measured from a rack rod 30a to the apex of the V) is somewhat less than the length of rack frame members 30b. With that arrangement, the racks may be easily and quickly moved from the position of Fig. 1 to that of Fig. 2 by lifting the racks slightly, and folding the supporting V-formations to positions lying under the racks and against the rack wires 32, and then the racks and their supports may be lowered to the positions shown in Fig. 2 where the grill wires 32 of the racks are substantially in the horizontal plane of the end portions of the tray grill wires 20. The depressed central portions of the tray grill wires are made to be of approximately just such length as to accommodate the racks when they are lowered; so that when the racks are lowered there is little or negligible gap between the rack grill wires 32 and the elevated end portions of the tray grill wires 20. Thus, in the folded position, the combined device presents a smooth and regular grill surface, substantially the same as that presented by an ordinary oven tray; while in an adjusted position such as shown in Fig. 1 the racks are ready for use as a rack for roasting or other operations.

We claim:

1. In a combined oven tray and cooking rack, a tray portion comprising structure having its outer edge parts lying in one horizontal plane and having its central parts relatively depressed to lie in a horizontal plane below the first mentioned plane, a pair of pivotally adjustable racks each pivoted at one edge to the tray structure on an axis which extends centrally across the tray structure, said racks adapted to be lowered on their pivots to lie in the depressed central parts of the tray structure and with the upper surfaces of the racks lying substantially in the first mentioned horizontal plane, and bracing supports pivoted to the outer edges of the racks adapted to rest on the tray structure to support the racks and adapted to be folded under the racks when the latter are lowered to lie in the depressed parts of the tray structure.

2. In a combined oven tray and cooking rack, a tray structure comprising an outer rectangular framing having side and end portions, a series of laterally spaced longitudinal grill wires secured to and extending between the frame end portions, the medial portions of at least some of the grill wires being depressed into a horizontal plane below the plane of the end portions of the grill wires, a transverse supporting rod secured to and extending between the side frame portions, said supporting rod extending under and supportingly engaging the depressed portions of the grill wires; a medial longitudinal pivot rod secured to and extending longitudinally between the end frame portions of the tray structure and lying approximately in the horizontal plane of the depressed grill wire portions, a pair of framed racks having their inner-lower edges pivoted on the pivot rod and adapted when lowered to lie on the depressed portions of the grill wires with the upper surfaces of the racks substantially flush with the undepressed portions of the grill wires, and supporting braces pivotally attached to the racks and adapted to rest upon the tray structure.

3. A combined oven tray and cooking rack as defined in claim 2, and in which the supporting braces are formed with notches at their lower ends adapted to take and rest upon the transverse supporting rod of the tray structure.

4. A combined oven tray and cooking rack as defined in claim 2, and in which each rack is formed with an outer wire framing substantially rectangular in form, the framing wire being formed into eyes at the inner-lower edges of the racks to take the longitudinal pivot rod and give pivotal support thereon to the racks, each rack also having laterally spaced longitudinal grill wires extending across and secured to its framing, and the bracing supports being formed of wire in V-formation, with the ends of the V-legs bent to form eyes which take the outer frame portions of the rack framing, the vertex portion of each V-formation being bent to form a downwardly facing notch adapted to take and rest upon the transverse supporting rod of the tray structure between grill wires of the tray structure, the bracing supports being adapted to fold under the racks against their grill wires and to lie under the racks and on the depressed portions of the tray structure grill wires when the racks are lowered upon those depressed portions.

5. In a combined oven tray and cooking rack, a tray portion comprising structure having its outer edge parts lying in one horizontal plane and having its central parts relatively depressed to lie in a horizontal plane below the first mentioned plane, a pair of pivotally adjustable racks each pivoted at one edge to the tray structure on an axis which extends centrally across the tray structure, said racks adapted to be lowered on their pivots to lie in the depressed central parts of the tray structure and with the upper surfaces of the racks lying substantially in the first mentioned horizontal plane, and adjustable supporting means associated with the tray structure and the racks and adapted to support the racks in adjusted angular elevation above the first mentioned horizontal plane.

6. In a combined oven tray and cooking rack, a tray structure comprising an outer rectangular framing having side and end portions, a series of laterally spaced longitudinal grill wires secured to and extending between the frame end portions, the medial portions of at least some of the grill wires being depressed into a horizontal plane below the plane of the end portions of the grill wires, a transverse supporting rod secured to and extending between the side frame portions, said supporting rod extending under and supportingly engaging the depressed portions of the grill wires; a medial longitudinal pivot rod secured to and extending longitudinally between the end frame portions of the tray structure and lying approximately in the horizontal plane of the depressed grill wire portions, a pair of framed racks having their inner-lower edges pivoted on the pivot rod and adapted when lowered to lie on the depressed portions of the grill wires with the upper surfaces of the racks substantially flush with the undepressed portions of the grill wires, and adjustable supporting means associated with the tray structure and the racks and adapted to support the racks in adjusted angular elevation above the plane of the undepressed portions of the grill wires.

HARRY D. WALL.
PRESTON B. WALL.